US012049110B2

(12) United States Patent
Iida

(10) Patent No.: US 12,049,110 B2
(45) Date of Patent: Jul. 30, 2024

(54) PNEUMATIC TIRE

(71) Applicant: The Yokohama Rubber Co., LTD., Tokyo (JP)

(72) Inventor: Takahiro Iida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 353 days.

(21) Appl. No.: 16/753,730

(22) PCT Filed: Sep. 28, 2018

(86) PCT No.: PCT/JP2018/036182
§ 371 (c)(1),
(2) Date: Apr. 3, 2020

(87) PCT Pub. No.: WO2019/069800
PCT Pub. Date: Apr. 11, 2019

(65) Prior Publication Data
US 2020/0254823 A1    Aug. 13, 2020

(30) Foreign Application Priority Data

Oct. 3, 2017   (JP) ................................. 2017-193277

(51) Int. Cl.
*B60C 11/12* (2006.01)
*B60C 11/04* (2006.01)
*B60C 11/03* (2006.01)

(52) U.S. Cl.
CPC .............. *B60C 11/12* (2013.01); *B60C 11/04* (2013.01); *B60C 2011/0341* (2013.01)

(58) Field of Classification Search
CPC ......................... B60C 11/12; B60C 2011/0341
See application file for complete search history.

(56) References Cited

U.S. PATENT DOCUMENTS

2007/0017618 A1   1/2007  Miyasaka et al.
2011/0024012 A1   2/2011  Iwai
(Continued)

FOREIGN PATENT DOCUMENTS

CN   102653215    9/2012
JP   H05-069706 A  3/1993
(Continued)

OTHER PUBLICATIONS

International Search Report for International Application No. PCT/JP2018/036182 dated Jan. 8, 2019, 4 pages. Japan.

*Primary Examiner* — Yung-Sheng M Tsui
(74) *Attorney, Agent, or Firm* — Thorpe North & Western

(57) ABSTRACT

In a tire tread pattern, lug grooves with sipes each include: a lug groove and a first sipe further extending from the lug groove to a second circumferential main groove and pass through a land portion region. Second sipes are alternately disposed with the lug grooves with sipes in a circumferential direction and pass through the land portion region. The second sipes extend inclined with respect to a lateral direction in a direction opposite to a direction in the circumferential direction in which the lug grooves with sipes are inclined. At an opening end at which the lug groove opens to a first circumferential main groove, the lug grooves with sipes and the second sipes are joined. Thus, triangular blocks surrounded by the second circumferential main groove, the lug grooves with sipes, and the second sipes are disposed side by side in the land portion region in the circumferential direction.

15 Claims, 5 Drawing Sheets

(56) References Cited

U.S. PATENT DOCUMENTS

| | | |
|---|---|---|
| 2012/0145295 A1 | 6/2012 | Yamada |
| 2012/0222788 A1 | 9/2012 | Nishiwaki |
| 2015/0136288 A1 | 5/2015 | Rubber |
| 2017/0355231 A1 | 12/2017 | Marlier et al. |
| 2018/0056728 A1 | 3/2018 | Rubber |

FOREIGN PATENT DOCUMENTS

| | | | | |
|---|---|---|---|---|
| JP | H06-055913 | | 3/1994 | |
| JP | 2006-297992 | | 11/2006 | |
| JP | 2007-030558 | | 2/2007 | |
| JP | 2011-031773 | | 2/2011 | |
| JP | 2011031773 A | * | 2/2011 | ......... B60C 11/0302 |
| JP | 2011-240773 | | 12/2011 | |
| JP | 2012-126214 | | 7/2012 | |
| JP | 2012-140091 | | 7/2012 | |
| JP | 2012140091 A | * | 7/2012 | |
| JP | 2012-180060 | | 9/2012 | |
| JP | 2012180060 A | * | 9/2012 | ......... B60C 11/0306 |
| JP | 2013-071633 | | 4/2013 | |
| JP | 5590267 | | 9/2014 | |
| JP | 2014-205459 | | 10/2014 | |
| JP | 2014205459 A | * | 10/2014 | |
| JP | 2015-027831 | | 2/2015 | |
| JP | 2015027831 A | * | 2/2015 | |
| JP | 2016-164027 | | 9/2016 | |
| JP | 2016164027 A | * | 9/2016 | ............. B60C 11/03 |
| WO | WO 2014/115589 | | 7/2014 | |
| WO | WO 2015/030101 A1 | | 3/2015 | |
| WO | WO 2016/102350 | | 6/2016 | |
| WO | WO 2016/143477 | | 9/2016 | |

\* cited by examiner

PNEUMATIC TIRE

TECHNICAL FIELD

The present technology relates to a pneumatic tire.

BACKGROUND ART

As a method of improving the wet performance of a tire, there is known a method of ensuring drainage performance by forming lug grooves extending in a tire width direction in addition to a main groove extending in a tire circumferential direction in a tread surface of a tire. However, the rigidity of land portions formed on the tread surface decreases with this method, and hence there arises a problem in that steering stability is likely to be degraded.

For a tire having a main groove and lug groove formed therein, there has been known a tread pattern in which one end of a lug groove is joined to the main groove and the other end is closed in a land portion region (see Japan Unexamined Patent Publication No. 2013-71633). In the tire including the main groove and the lug groove in such mode, drainage performance is secured, and decrease in the rigidity of the land portions is further prevented as compared to a case where both ends of the lug groove are joined to the main groove. Thus, it is conceived that wet performance and steering stability can be provided in a compatible manner to a certain degree.

Incidentally, for a tire mounted to a commercial vehicle used for transportation of cargoes and passengers, various tire performances are required. For example, for a tire mounted to a commercial vehicle that frequently travels on highways, for example, steering stability during high-speed traveling is required. Further, for a tire mounted to a commercial vehicle used for delivery services in a city area, steering stability during high-speed traveling on winding arterial roads connecting cities is also required. Meanwhile, wet performance (wet steering stability) on road surfaces having a low μ such as brick roads in cities is also required.

However, with the tread pattern described above in which the one end of the lug groove is joined to the main groove and the other end is closed in the land portion region, steering stability during high-speed traveling is insufficient, and there may be a risk in that wet steering stability decreases.

SUMMARY

The technology provides a pneumatic tire capable of suppressing the degradation of wet steering stability.

According to one mode of the present technology, a pneumatic tire includes a tread portion provided with a tread pattern, the tread pattern including: at least two circumferential main grooves extending in a tire circumferential direction; a plurality of lug grooves with sipes being disposed at an interval in the tire circumferential direction in a land portion region and extending to pass through the land portion region; the lug grooves with sipes each including: a lug groove extending in the land portion region between the circumferential main grooves from a first circumferential main groove toward a second circumferential main groove of the circumferential main grooves and being closed in the land portion region; and a first sipe further extending from the lug groove toward the second circumferential main groove; and a plurality of second sipes being alternately disposed with the plurality of lug grooves with sipes in the tire circumferential direction at an interval in the tire circumferential direction in the land portion region and extending to pass through the land portion region, wherein the lug grooves with sipes extend to be inclined with respect to a tire width direction, the second sipes extend to be inclined with respect to the tire width direction in a side opposite to a side in the tire circumferential direction in which the lug grooves with sipes are inclined, the lug grooves with sipes and the second sipes are connected at an opening end at which the lug groove opens to the first circumferential main groove such that a plurality of substantially triangular blocks surrounded by the second circumferential main groove, the lug grooves with sipes, and the second sipes are disposed side by side in the land portion region in the tire circumferential direction.

The first sipe preferably has a sipe depth at an end joined to the lug groove shallower than that of an intermediate region in an extending direction of the first sipe.

Preferably, the plurality of second sipes each have a sipe depth at opening ends opening to the circumferential main grooves, shallower than that of an intermediate region between the opening ends.

The lug groove preferably has a groove width at an end connected to the first sipe narrower than that of the opening end.

The lug groove preferably has a groove depth at the end connected to the first sipe shallower than that of the opening end.

A closed end of the lug groove is preferably positioned in a region of from 20 to 70% of a length of the land portion region in the tire width direction from the first circumferential main groove in the tire width direction.

The substantially triangular blocks are preferably disposed at an interval in the tire circumferential direction, and the interval preferably has a length from 0 to 130% of a length of the opening end of the lug groove in the tire circumferential direction.

The second circumferential main groove is preferably disposed closer to a tire centerline with respect to the first circumferential main groove.

Preferably, the tread pattern further includes, a third circumferential main groove positioned on a side opposite a side in which the first circumferential main groove is positioned in the tire width direction with respect to the second circumferential main groove. When the land portion region, the lug groove, the lug grooves with sipes, and the substantially triangular blocks are each referred to as: a first land portion region, a first lug groove, first lug grooves with sipes, and first substantially triangular blocks, preferably, the tread pattern further includes: a plurality of second lug grooves with sipes being disposed at an interval in the tire circumferential direction in a second land portion region and extending to pass through the second land portion region; the second lug grooves with sipes each including: a second lug groove extending in the second land portion region between the second circumferential main groove and the third circumferential main groove from the third circumferential main groove toward the second circumferential main groove and being closed in the second land portion region; and a third sipe further extending from the second lug groove to the second circumferential main groove; and a plurality of fourth sipes being alternately disposed with the second lug grooves with sipes in the tire circumferential direction at an interval in the second land portion region in the tire circumferential direction and extending to pass through the second land portion region. The plurality of second lug grooves with sipes preferably extend to be inclined with respect to the tire width direction. The fourth sipes preferably extend to be inclined with respect to the tire width direction in a side opposite to a side in the tire circumferential direction in which the second lug grooves with sipes are inclined. The second lug grooves with sipes and the fourth sipes are preferably connected at an opening end at which the second lug groove opens to the third circumferential main groove such that a plurality of second substantially triangular blocks surrounded by the second circumferential main groove, the second lug grooves with sipes, and the fourth sipes are preferably disposed side by side in the second land portion region in the tire circumferential direction. Ends of the first substantially triangular blocks in the tire circumferential direction and ends of the second substantially triangular blocks in the tire circumferential direction are preferably disposed at different positions in the tire circumferential direction.

According to the present technology, uneven wear can be prevented from being caused while providing wear resistance performance and wet performance in a compatible manner.

DETAILED DESCRIPTION

A pneumatic tire according to the present embodiment described below (hereinafter, also referred to as a tire), is applied to a tire for a small truck or a tire for a bus and a truck, for example, and may be applied to a tire for a passenger vehicle such as a tire for a taxi. The pneumatic tire according to the present embodiment described below is a tire for a small truck. The present embodiment encompasses various embodiments described later.

Figure 1:
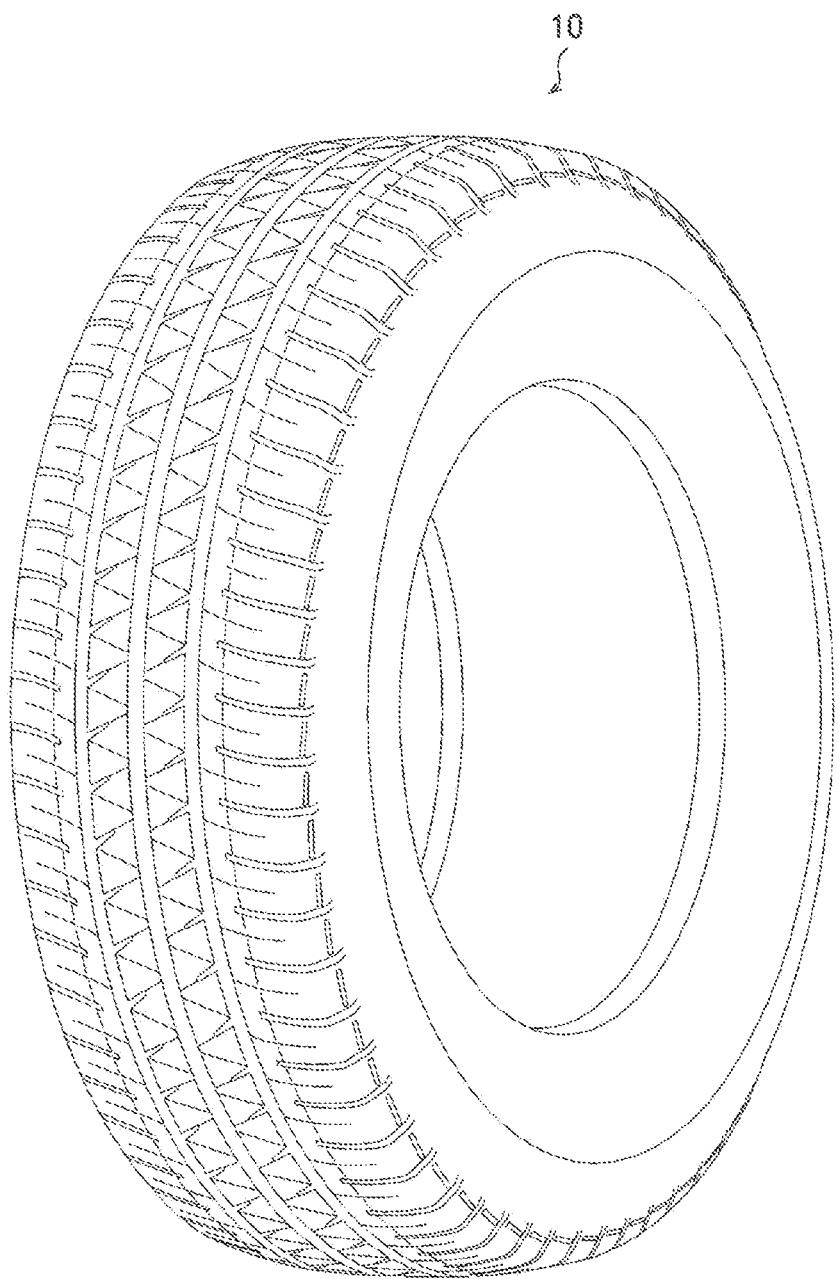
FIG. 1 is a perspective view illustrating one example of an outer appearance of a pneumatic tire according to the present embodiment.

FIG. 1 is an external perspective view of a tire 10 according to the present embodiment.

A tire width direction is a direction parallel to a rotation axis of the tire 10. Outward in the tire width direction is a side in the tire width direction away from a tire centerline CL (see FIG. 2) representing a tire equatorial plane. Also, inward in the tire width direction is a side in the tire width direction closer to the tire centerline CL. A tire circumferential direction is a direction in which the tire rotates about the rotation axis of the tire as a center. A tire radial direction is a direction orthogonal to the rotation axis of the tire 10. Outward in the tire radial direction is a side away from the rotation axis. Similarly, inward in the tire radial direction is a side closer to the rotation axis.

Tire Structure

Figure 2:
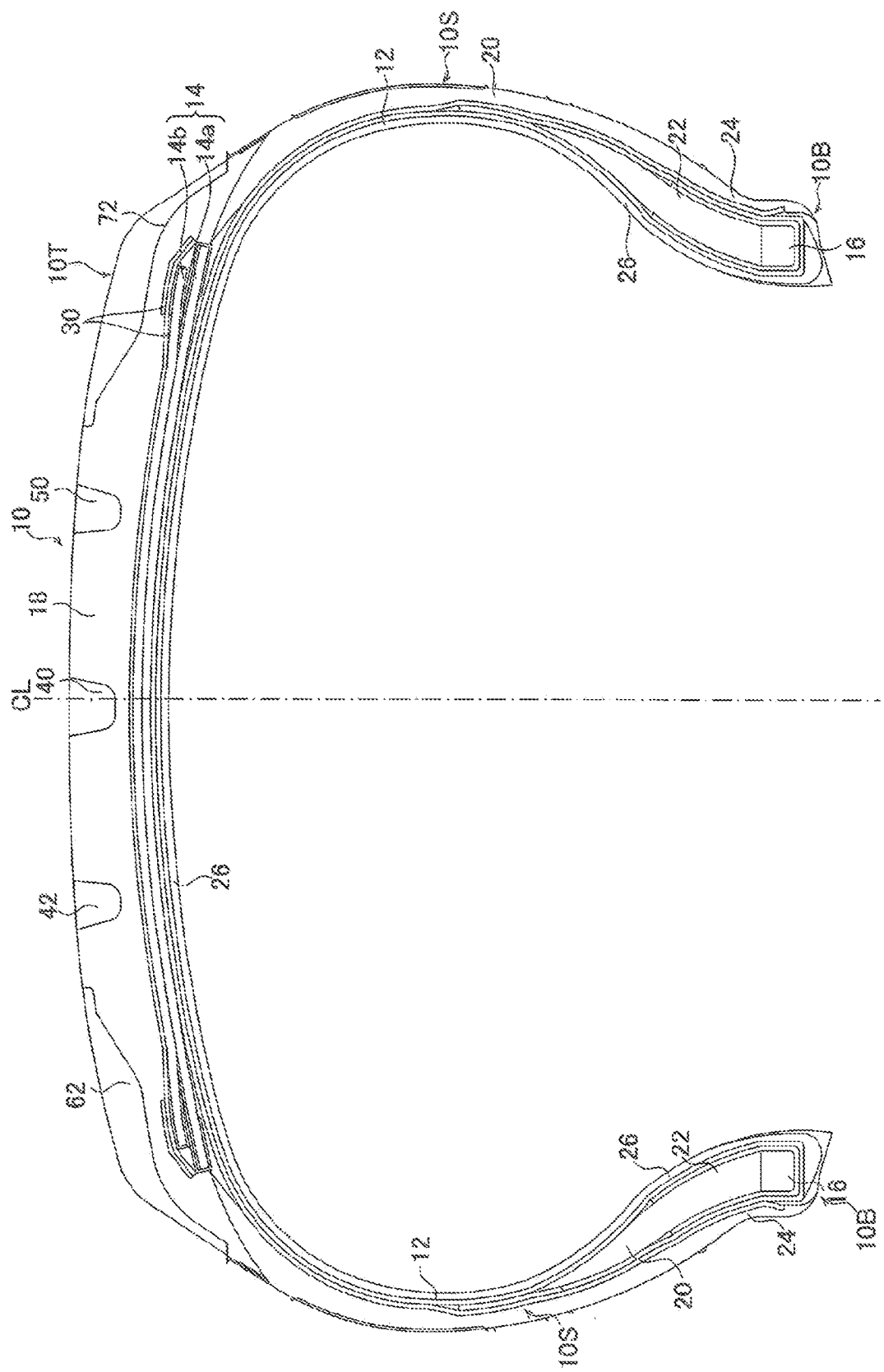
FIG. 2 is a diagram illustrating one example of a profile cross-section of the pneumatic tire according to the present embodiment.

FIG. 2 is a profile cross-sectional view of the tire 10 according to the present embodiment. The tire 10 includes: a tread portion 10T including a tread pattern; a pair of bead portions 10B; and a pair of side portions 10S provided on both sides of the tread portion 10T and joined to the pair of bead portions 10B and the tread portion 10T.

The tire 10 mainly includes a carcass ply 12, a belt 14, and a bead core 16 as framework members, and a tread rubber member 18, side rubber members 20, bead filler rubber members 22, rim cushion rubber members 24, and an innerliner rubber member 26 around the framework members.

The carcass ply 12 is composed of a carcass ply member that is made of organic fibers covered with rubber and that is wound between the pair of bead cores 16 having an annular shape and is formed into a toroidal shape. The carcass ply 12 is wound back around the bead cores 16 and extends outward in the tire radial direction. The belt 14 is provided outward of the carcass ply 12 in the tire radial direction and is composed of two belt members 14a, 14b. The belt 14 is formed of a member including rubber-covered steel cords arranged to be inclined at a predetermined angle, for example, of from 20 degrees to 30 degrees with respect to the tire circumferential direction, and a width of the belt member 14a in the lower layer in the tire width direction is larger than that of the belt member 14b in the upper layer. The steel cords of the two belt members 14a, 14b are inclined in opposite directions. As such, the belt members 14a, 14b are crossing layers serving to suppress the expansion of the carcass ply 12 due to the air pressure in the tire.

The tread rubber member 18 is provided outward of the belt 14 in the tire radial direction. Both end portions of the tread rubber member 18 are joined to the side rubber members 20, thus forming the side portions 10S. The rim cushion rubber members 24 are provided at the ends inward of the side rubber members 20 in the tire radial direction and come into contact with a rim on which the tire 10 is mounted. The bead filler rubber member 22 is provided outward of the bead core 16 in the tire radial direction and thus is sandwiched between a portion of the carcass ply 12 prior to being wound around the bead core 16 and a wound portion of the carcass ply 12 wound around the bead core 16. The innerliner rubber member 26 is provided on the inner surface of the tire 10 facing a tire cavity region that is filled with air and is surrounded by the tire 10 and the rim.

In addition, a two-layer belt cover 30 formed of rubber-covered organic fibers and covering the belt 14 from outward of the belt 14 in the tire radial direction is included between the belt member 14b and the tread rubber member 18.

Tread Pattern

Figure 3:
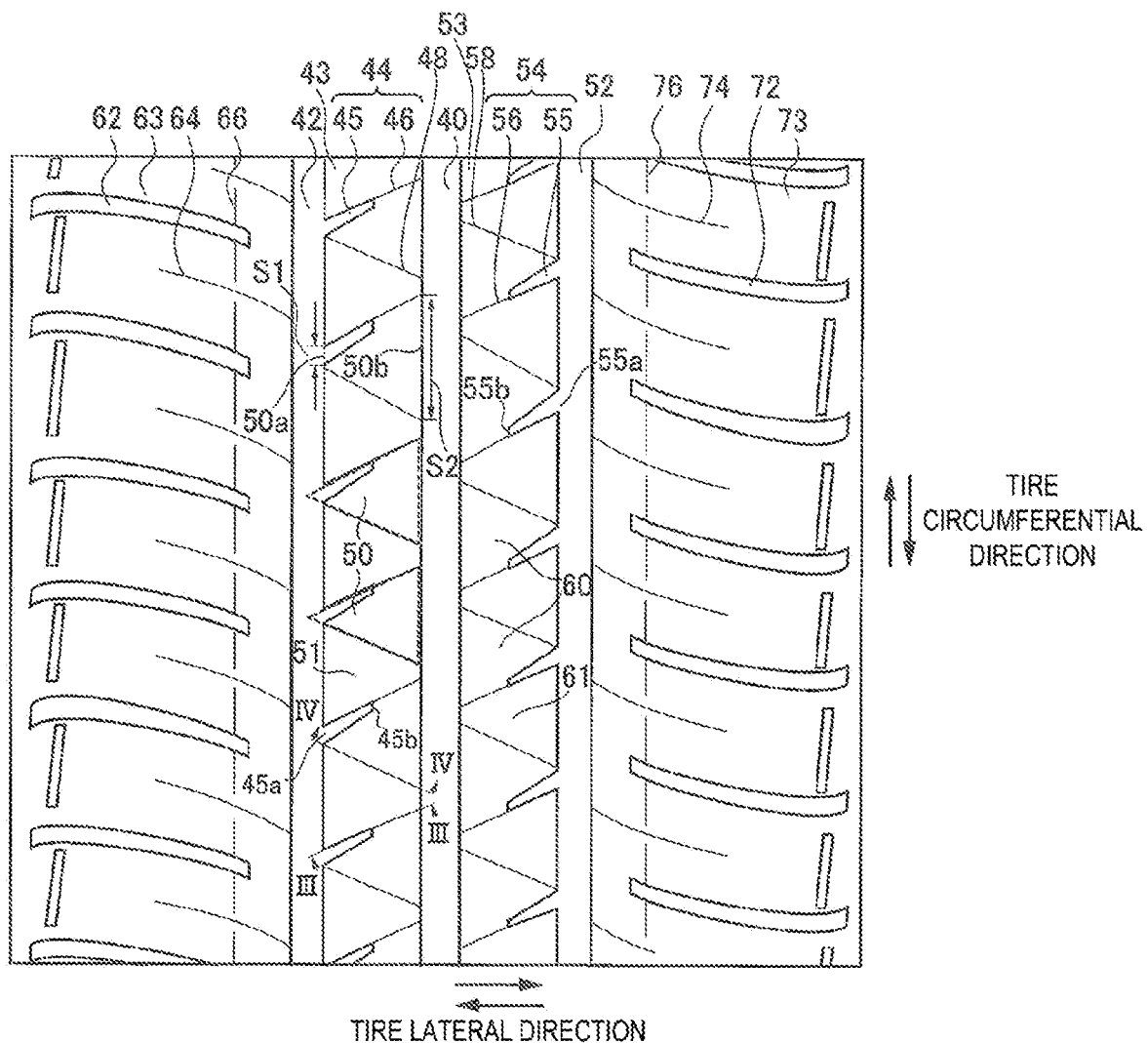
FIG. 3 is a diagram illustrating one example of a tread pattern of the tire in FIG. 2.

FIG. 3 is a diagram illustrating one example of a tread pattern of the tire 10 in FIG. 2.

The tread pattern includes: at least two circumferential main grooves; a plurality of lug grooves with sipes 44; and a plurality of second sipes 48.

The circumferential main grooves extend in the tire circumferential direction. The circumferential main grooves include a first outer circumferential main groove (first circumferential main groove) 42 and a center circumferential main groove (second circumferential main groove) 40.

The lug groove with a sipe 44 (first lug groove with a sipe) is formed of a lug groove (first lug groove) 45 and a first sipe 46. The lug grooves with sipes 44 are disposed at an interval in the tire circumferential direction in a first inner land portion region 43 between the first outer circumferential main groove 42 and the center circumferential main groove 40 and extend to pass through the first inner land portion region 43.

The lug groove 45 extends from the first outer circumferential main groove 42 to the center circumferential main groove 40 in the first inner land portion region 43 and is closed in the first inner land portion region 43.

The first sipe 46 further extends from the lug groove 45 to the center circumferential main groove 40.

Thus, the lug grooves with sipes 44 extend to be inclined with respect to the tire width direction. The inclination angle of the lug grooves with sipes 44 with respect to the tire width direction is, for example, from 15 degrees to 45 degrees, preferably from 25 degrees to 35 degrees.

With such lug grooves with sipes 44, the lug groove 45 secures drainage performance, and the first sipe 46 secures the rigidity of the first inner land portion region 43.

The second sipes 48 are disposed in the first inner land portion region 43 at an interval in the tire circumferential direction, are alternately disposed with the lug grooves with sipes 44 in the tire circumferential direction, and extend to pass through the first inner land portion region 43. The second sipes 48 contribute to prevent the rigidity of the first inner land portion region 43 from being degraded.

The second sipes 48 extend to be inclined with respect to the tire width direction in a direction (downward in FIG. 3) opposite to a direction in which the lug grooves with sipes 44 are inclined in the tire circumferential direction (upward in FIG. 3). The inclination angle of the second sipes 48 with respect to the tire width direction is, for example, from 15 degrees to 45 degrees, preferably from 25 degrees to 35 degrees.

In the present embodiment, at an opening end 45a at which the lug groove 45 opens to the first outer circumferential main groove 42, the lug groove with a sipe 44 and the second sipe 48 are joined. With this, a plurality of substantially triangular blocks (first substantially triangular blocks) 50 each of which is surrounded by the center circumferential main groove 40, the lug groove with a sipe 44, and the second sipe 48 are disposed side by side in the first inner land portion region 43 in the tire circumferential direction.

When a part (line) at which the opening end 45a of the lug groove 45 is in contact with the first outer circumferential main groove 42 is referred to as a first side 50a; and when a part (line) extending in the tire circumferential direction between two opening ends at which the lug groove with a sipe 44 and the second sipe 48 open to the center circumferential main groove 40, the lug groove with a sipe 44 and the second sipe 48 being joined to each other at the opening end 45a, is referred to as a second side 50b, the substantially triangular block is a trapezoidal block surrounded by the first side 50a, the second side 50b, the lug groove with a sipe 44, and the second sipe 48. In the block, a distance between the lug groove with a sipe 44 and the second sipe 48 in the tire circumferential direction is increased as approaching the center circumferential main groove 40 from the first outer circumferential main groove 42, and a tire circumferential position of the first side 50a is present in a range in which the second side 50b is positioned in the tire circumferential direction.

In the present embodiment, in the first inner land portion region 43 in which the lug grooves with sipes 44 are disposed, the substantially triangular blocks 50 are arranged side by side in the tire circumferential direction. With this, as compared to a case where parallelogram blocks are arranged side by side in the tire circumferential direction, an effect of preventing blocks from flexing is highly exerted with respect to an external force in any of the tire circumferential direction and the tire width direction, which is received from road surfaces during the traveling of a vehicle. Thus, when a vehicle travels, the degradation of the rigidity of the first inner land portion region 43 can be prevented, steering stability during high-speed traveling (hereinafter, also referred to as high-speed steering stability) can be improved. The parallelogram blocks are blocks formed in the land portion region, in a case where a plurality of lug grooves and a plurality of sipes, which extend to be inclined to the same side in the tire circumferential direction with respect to the tire width direction, are disposed at an interval in the tire circumferential direction and pass through the land portion region. Such parallelogram blocks are more likely to flex in any of the tire circumferential direction and the tire width direction, and an effect of preventing the rigidity of the land portion region from decreasing is insufficient.

Further, in the present embodiment, as compared to lug grooves passing through the land portion region, the lug grooves with sipes 44 degrade drainage performance, but the rigidity of the first inner land portion region 43 is secured by forming the first sipes 46. Thus, cornering power obtained at the time of turning is large, and steering stability is high. On road surfaces having a low μ and a low friction coefficient such as brick roads, a thick water film is less likely to be formed. Thus, although drainage performance is degraded, steering stability is high, which allows high wet performance to be exerted. In the present embodiment, the lug grooves with sipes 44 are provided. Thus, the rigidity of the first inner land portion region 43 is improved, and wet performance on road surfaces having a low μ (hereinafter, also referred to as wet steering stability) is excellent.

Further, in the present embodiment, the first side 50a is formed of the opening end 45a of the lug groove 45 and is in contact with the opening end 45a and the second sipe 48.

Figure 4:
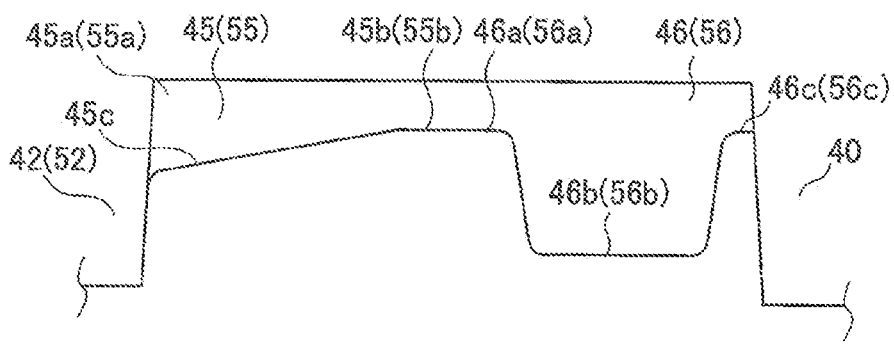
FIG. 4 is a view in the direction of arrow in FIG. 3.

FIG. 4 is a view in the direction of arrow III-III in FIG. 3.

According to one embodiment, as illustrated in FIG. 4, at an end 46a joined to the lug groove 45, the first sipe 46 preferably has a sipe depth shallower than that of an intermediate region 46b in an extending direction of the first sipe 46. With this, the rigidity of the center portion of the first inner land portion region 43 in the tire width direction is improved, and thus an effect of improving high-speed steering stability is increasingly exerted. In the example illustrated in FIG. 4, in the first sipe 46, a sipe depth of both ends (raised bottom portions) 46a, 46c in the extending direction is shallower than that of the intermediate region (sipe bottom portion) 46b. According to one embodiment, as illustrated in FIG. 4, the sipe depth of the intermediate region 46b of the first sipe 46 is deeper than the groove depth of the lug groove 45.

In the first sipe 46, a length of each of the raised bottom portions 46a, 46c in the extending direction preferably has a length from 10% to 40% of a length of the sipe bottom portion 46b in the extending direction. When the length is 10% or greater, the rigidity of the center portion of the first inner land portion region 43 in the tire width direction and the end portion on the center circumferential main groove 40 side can be improved sufficiently. When the length is 40% or less, an effect of improving balance of the rigidity of the first inner land portion region 43, which is described later, is increasingly exerted.

Further, in the first sipe 46, the sipe depth of the raised bottom portions 46a, 46c preferably has a depth from 10% to 40% of the sipe depth of the sipe bottom portion 46b.

When the depth is 10% or greater, drainage performance exerted by the lug groove 45 is secured. When the depth is 40% or less, the rigidity of the center portion of the first inner land portion region 43 in the tire width direction and the end portion on the center circumferential main groove 40 side can be improved sufficiently.

Note that, according to one embodiment, the first sipe 46 is preferably joined to the lug groove at a position on outward in the tire circumferential direction with respect to a center position of the groove width of the lug groove 45, preferably, at a position of an end outward of the groove width of the lug groove 45 in the tire circumferential direction. Outward in the tire circumferential direction is referred to a side close to the first sipe 46 from the lug groove 45 in the tire circumferential direction.

According to one embodiment, the groove width of the lug groove 45 at an end 45b (closed end of the lug groove 45) joined to the first sipe 46 is preferably narrower than the opening end 45a. With this, an effect of improving the rigidity of the center portion of the first inner land portion region 43 in the tire width direction is increasingly exerted. In the example illustrated in FIG. 4, the lug groove 45 has a groove width that is reduced as approaching the closed end 45b from the opening end 45a.

With regard to the groove width of the lug groove 45 in the tire circumferential direction, a groove width b of the closed end 45b preferably has a length from 40% to 70% of a groove width a of the opening end 45a. With this, drainage performance can be secured, and the rigidity of the center portion of the first inner land portion region 43 in the tire width direction can be improved in a compatible manner.

Further, according to one embodiment, the groove depth of the lug groove 45 at the end 45b joined to the first sipe 46 is preferably shallower than that of the opening end 45a. With this, an effect of improving the rigidity of the center portion of the first inner land portion region 43 in the tire width direction is increasingly exerted. In the example illustrated in FIG. 4, the lug groove 45 includes a part 45c having a groove depth that is gradually reduced as approaching the closed end 45b form the opening end 45a. Further, in the example illustrated in FIG. 4, the lug groove 45 has a constant groove depth at the closed end 45b and has the same groove depth as the groove depth at the end 46a in the extending direction of the first sipe 46.

In the lug groove 45, a groove depth t at the closed end 45b preferably has a length from 40% to 70% of a groove depth s at the opening end 45a. With this, drainage performance can be secured, and the rigidity of the center portion of the first inner land portion region 43 in the tire width direction can be improved in a compatible manner.

Figure 5:
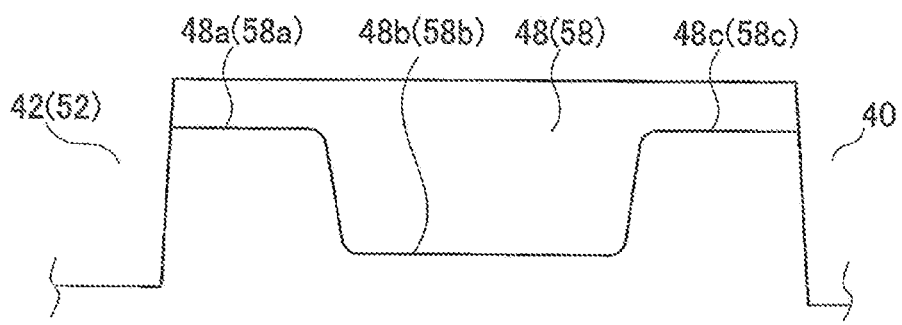
FIG. 5 is a view in the direction of arrow IV-IV in FIG. 3.

FIG. 5 is a view in the direction of arrow IV-IV in FIG. 3.

According to one embodiment, in a case where, at the end 46a joined to the lug groove 45, the first sipe 46 has a sipe depth shallower than that of the intermediate region 46b in the extending direction of the first sipe 46 as described above, at opening ends 48a, 48c opening to the circumferential main groove 42, 40, the second sipe 48 preferably has a sipe depth shallower than an intermediate region 48b between the opening ends 48a, 48c as illustrated in FIG. 5. According to this mode, the second sipe 48 and the first sipe 46 form oblique lines of the substantially triangular block and are alternately disposed in the tire circumferential direction. With this, parts with high rigidity and parts with low rigidity that are alternately formed in the tire circumferential direction in the center portion of the first inner land portion region 43 in the tire width direction; and parts with high rigidity and parts with low rigidity that are alternately formed in the tire circumferential direction at the end portion of the first inner land portion region 43 in the tire width direction are disposed in the tire circumferential direction in an offsetting manner. That is, when the first inner land portion region 43 is seen in the tire width direction, the rigidity of the parts disposed in the center portion of the first inner land portion region 43 in the tire width direction; and the rigidity of the parts disposed at the end portion are different from each other in the degree of rigidity. Thus, the balance of the rigidity of the entire first inner land portion region 43 is improved, which contributes to improvement in high-speed steering stability.

According to one embodiment, depths at both the ends 48a, 48c of the second sipe 48 in the tire width direction preferably have a length from 40% to 70% of the depth of the opening end 45a of the lug groove 45. With this, drainage performance can be secured, and the balance of the rigidity of the entire first inner land portion region 43 can be improved in a compatible manner.

Figure 6:
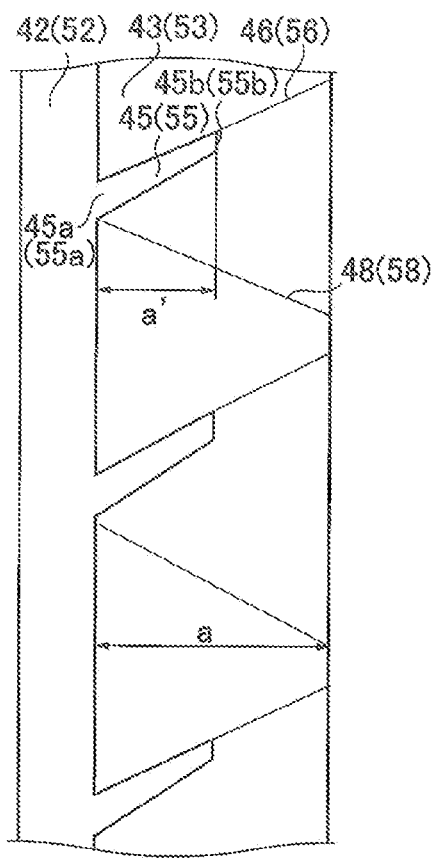
FIG. 6 is a diagram enlarging a part of FIG. 3.

FIG. 6 is diagram enlarging a part of FIG. 3.

According to one embodiment, as illustrated in FIG. 6, the closed end 45b of the lug groove 45 is preferably positioned in a region from 20% to 70% of a length a of the first inner land portion region 43 in the tire width direction, from the first outer circumferential main groove 42 in the tire width direction (the example of the region to the position of the closed end 45b that matches the region is indicated a' in FIG. 6). When the closed end 45b is positioned in a region less than 20%, drainage performance is insufficient, which disadvantageously affects wet steering stability in some cases. When the closed end 45b is positioned in a region exceeding 70%, the rigidity of the first inner land portion region 43 cannot be secured sufficiently in some cases.

Note that, according to one embodiment, with regard to the substantially triangular block 50, the first side 50a is preferably positioned in a range of a length of 20% of the length of the second side 50b in the tire circumferential direction, which includes the center of the range in which the second side 50b is positioned in the tire circumferential direction (the center point of the second side 50b). As described above, the first side 50a is positioned in the vicinity of the center of the range in which the second side 50b is positioned in the tire circumferential direction, and hence the substantially triangular blocks are less likely to flex in the tire width direction, which is exerted evenly in the tire circumferential direction. During high-speed traveling, a lateral force received from road surfaces is large, and hence the substantially triangular blocks in this mode are preferred.

Further, a lower limit value of a ratio of S1 to S2 is preferably 10%.

Figure 7:
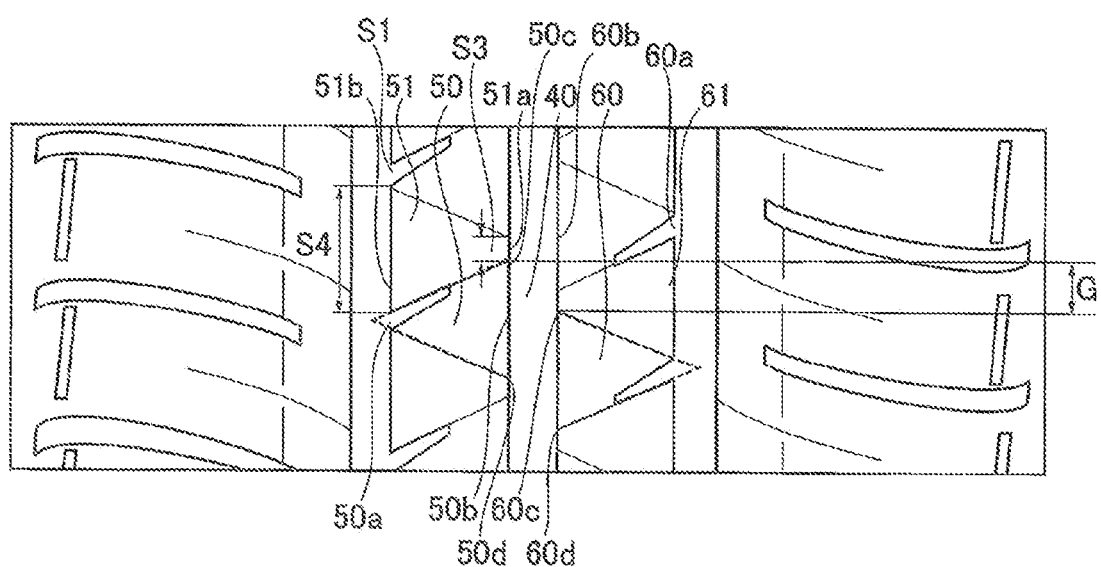
FIG. 7 is a diagram illustrating a part of FIG. 3.

FIG. 7 is a diagram illustrating a part of FIG. 3.

According to one embodiment, as illustrated in FIG. 7, the substantially triangular blocks 50 are disposed at an interval S3 in the tire circumferential direction, and the interval S3 has a length from 0% to 130% of the length S1 of the opening end 45a of the lug groove 45 in the tire circumferential direction. In other words, the interval S3 is the length S3 of a part (third side 51a) at which another substantially triangular block 51 positioned between the adjacent substantially triangular blocks 50 is in contact with the center circumferential main groove 40. The length S1 of the first side 50a of the substantially triangular block 50 and the length S3 of the third side 51a of the other substantially triangular block 51 are equivalent to each other in the tire circumferential direction, and hence the block can be prevented from flexing with respect to an external force, which is received from road surfaces, to the equivalent extent both in the tire circumferential direction and the tire width direction. Thus, an effect of improving the rigidity of the first inner land portion region 43 during the traveling of a vehicle is increasingly exerted.

The interval S3 is preferably greater than 0% and 120% or less of the length S1 of the opening end 45a of the lug groove 45 in the tire circumferential direction. S4 is an interval in the tire circumferential direction between the opening ends 45a of lug grooves 45 that are adjacent in the tire circumferential direction.

According to one embodiment, the center circumferential main groove 40 is preferably disposed closer to the tire centerline CL with respect to the first outer circumferential main groove 42. The lug groove 45 is positioned outward in the tire width direction, and the first sipe 46 is positioned inward in the tire width direction. With this, the rigidity of parts corresponding to the land portion regions 43, 53 (parts in the vicinity of the tire centerline CL) on both sides of the center circumferential main groove 40 is secured, which contributes to improvement in high-speed steering stability. Note that the mode in which the center circumferential main groove 40 is disposed in the vicinity of the tire centerline CL includes a mode in which the tire centerline CL passes through the center circumferential main groove 40. More preferably, the tire centerline CL passes through the center circumferential main groove 40.

According to one embodiment, the tread pattern of the tire 10 preferably has a mode described below.

As illustrated in FIG. 3, the tread pattern of the tire 10 further includes a second outer circumferential main groove (third circumferential main groove) 52 as a circumferential main groove and further includes a plurality of second lug grooves with sipes 54 and a plurality of fourth sipes 58.

The second outer circumferential main groove 52 is positioned on a side opposite a side on which the first outer circumferential main groove 42 is positioned in the tire width direction (the left side in FIG. 3) with respect to the center circumferential main groove 40.

The second lug groove with a sipe 54 is formed of a second lug groove 55 and a third sipe 56. The second lug grooves with sipes 54 are disposed at an interval in the tire circumferential direction in a second inner land portion region 53 between the center circumferential main groove 40 and the second outer circumferential main groove 52 and extend to pass through the second inner land portion region 53.

The second lug groove 55 extends in the second inner land portion region 53 from the second outer circumferential main groove 52 to the center circumferential main groove 40 and is closed in the second inner land portion region 53.

The third sipe 56 further extends from the second lug groove 55 to the center circumferential main groove 40.

Thus, the second lug grooves with sipes 54 extend to be inclined with respect to the tire width direction.

The fourth sipes 58 are arranged in the second inner land portion region 53 at an interval in the tire circumferential direction, are alternately disposed with the second lug grooves with sipes 54 in the tire circumferential direction, and extend to pass through the second inner land portion region 53.

The fourth sipes 58 extend to be inclined with respect to the tire width direction in a direction (upward in FIG. 3) opposite to a direction in which the second lug grooves with sipes 54 are inclined in the tire circumferential direction (downward in FIG. 3).

In this mode, at an opening 55a at which the second lug groove 55 opens to the second outer circumferential main groove 52, the second lug groove with a sipe 54 and the fourth sipe 58 are joined. With this, a plurality of second substantially triangular blocks 60 each of which is surrounded by the center circumferential main groove 40, the second lug groove with a sipe 54, and the fourth sipe 58 are disposed side by side in the second inner land portion region 53 in the tire circumferential direction. Similar to a manner in which the first substantially triangular block 50 is defined through the use of the elements in the first inner land portion region 43 as described above, the second substantially triangular block 60 is defined through the use of the elements in the second inner land portion region 53. That is, when a part (line) at which the opening end 55a of the lug groove 55 is in contact with the second outer circumferential main groove 52 is referred to as a third side 60a; and when a part (line) extending in the tire circumferential direction between two opening ends at which the second lug groove with a sipe 54 and the fourth sipe 58 open to the center circumferential main groove 40, the second lug groove with a sipe 54 and the fourth sipe 58 being joined to each other at the opening end 55a, is referred to as a fourth side 60b, the substantially triangular block 60 is a trapezoidal block surrounded by the third side 60a, the fourth side 60b, the second lug groove with a sipe 54, and the fourth sipe 58, a distance between the second lug groove with a sipe 54 and the fourth sipe 58 in the tire circumferential direction is increased as approaching the center circumferential main groove 40 from the second outer circumferential main groove 52, and a tire circumferential position of the third side 60a is present in a range in which the fourth side 60b is positioned in the tire circumferential direction.

Further, in this mode, as illustrated in FIG. 7, ends 50c, 50d of the first substantially triangular block 50 in the tire circumferential direction and ends 60c, 60d of the second substantially triangular block 60 in the tire circumferential direction are disposed at different positions in the tire circumferential direction.

In the tread pattern having the above-mentioned mode, on a side facing the second side 50b of the first substantially triangular block 50 across the center circumferential main groove 40, a side (a line between the adjacent fourth sides 60b) in contact with the center circumferential main groove 40 between the adjacent second substantially triangular blocks 60 is positioned. Thus, at parts corresponding to the land portion regions 43, 53 on both sides of the center circumferential main groove 40 (parts in the vicinity of the tire centerline CL), parts in which rigidity is excessively degraded are prevented from being formed.

The shortest distance between the end 50c and the end 60c in the tire circumferential direction; or the shortest distance between the end 50d and the end 60d in the tire circumferential direction (a deviation amount G in the tire circumferential direction) is preferably from 10% to 40% of the length of the second side 50b of the substantially triangular block 50. With this, at the parts corresponding to the land portion regions 43, 53 on both sides of the center circumferential main groove 40 (parts in the vicinity of the tire centerline CL), parts in which rigidity is excessively degraded are prevented from being formed. At the same time, parts in which rigidity is excessively high are prevented from being formed. Thus, the balance of the rigidity of the entire first inner land portion region 43 and the entire second inner land portion region 53 is improved.

In the tread pattern having the above-mentioned mode, further, the first substantially triangular blocks 50 and the second substantially triangular blocks 60 are preferably point symmetrical with respect to the point positioned at the center of the groove width of the center circumferential main groove 40 as a reference. With this, on the end portions of the land portion regions 43, 53 outward in the tire width direction, the first lug grooves 45 and the second lug grooves 55 are disposed in the tire circumferential direction in an offsetting manner. Thus, parts of the land portion regions 43, 53 in which rigidity is degraded are dispersed in the tire circumferential direction, and the balance of the rigidity of the entire land portion regions 43, 53 is improved.

Further, more preferably, the elements provided to the first inner land portion region 43 and the elements provided to the second inner land portion region 53 are point symmetrical with respect to the point positioned at the center of the groove width of the center circumferential main groove 40 as a reference.

Note that, in FIG. 4 to FIG. 6, the elements in the second inner land portion region 53 that correspond to those in the first inner land portion region 43 are denoted with reference symbols in parentheses.

According to one embodiment, the number of circumferential main grooves is preferably three. As compared to the case in which the number is four or more, the degradation of the rigidity of the land portion regions 43, 53 can be prevented effectively, and high-speed steering stability can be improved.

According to one embodiment, preferably, the tread pattern further includes a plurality of shoulder lug grooves 62, 72, a plurality of shoulder sipes 64, 74, and a plurality of circumferential sipes 66, 76.

The shoulder lug grooves 62 are disposed at an interval in the tire circumferential direction in a shoulder land portion region 63 positioned outward of the first outer circumferential main groove 42 in the tire width direction. The shoulder lug groove 62 extends from outward in the tire width direction with respect to the ground contact edge to the first outer circumferential main groove 42 and is closed in the shoulder land portion region 63.

The shoulder lug grooves 72 are disposed at an interval in the tire circumferential direction in a shoulder land portion region 73 positioned outward of the second outer circumferential main groove 52 in the tire width direction. The shoulder lug groove 72 extends from outward in the tire width direction with respect to the ground contact edge to the second outer circumferential main groove 52 and is closed in the shoulder land portion region 73.

Note that the ground contact edges are both ends of the ground contact surface in the tire width direction when the tire 10 is brought into contact with a horizontal surface under conditions of the tire 10 being mounted on a regular rim, inflated to the regular internal pressure, and loaded with 88% of the regular load. The regular rim refers to a "measuring rim" defined by JATMA (Japan Automobile Tyre Manufacturers Association, Inc.), a "Design Rim" defined by TRA (The Tire and Rim Association, Inc.), and a "Measuring Rim" defined by ETRTO (European Tire and Rim Technical Organization). The regular internal pressure refers to a "maximum air pressure" defined by JATMA, the maximum value in "TIRE LOAD LIMITS AT VARIOUS COLD INFLATION PRESSURES" defined by TRA, and "INFLATION PRESSURES" defined by ETRTO. The regular load refers to a "maximum load capacity" defined by JATMA, the maximum value in "TIRE LOAD LIMITS AT VARIOUS COLD INFLATION PRESSURES" defined by TRA, and "LOAD CAPACITY" defined by ETRTO.

The shoulder sipes 64 are alternately disposed with the shoulder lug grooves 62 at an interval in the tire circumferential direction in the shoulder land portion region 63. The shoulder sipe 64 extends outward in the tire width direction from the first outer circumferential main groove 42 and is closed in the shoulder land portion region 63 on inward in the tire width direction with respect to the ground contact edge.

The shoulder sipes 74 are alternately disposed with the shoulder lug grooves 72 at an interval in the tire circumferential direction in the shoulder land portion region 73. The shoulder sipe 74 extends outward in the tire width direction from the second outer circumferential main groove 52 and is closed in the shoulder land portion region 73 on inward in the tire width direction with respect to the ground contact edge.

The circumferential sipes 66 are disposed at an interval in the tire circumferential direction in the shoulder land portion region 63. The circumferential sipe 66 extends in the tire circumferential direction, is joined to the shoulder lug groove 62, and is not joined to the shoulder sipe 64.

The circumferential sipes 76 are disposed at an interval in the tire circumferential direction in the shoulder land portion region 73. The circumferential sipe 76 extends in the tire circumferential direction, is joined to the shoulder lug groove 72, and is not joined to the shoulder sipe 74.

Preferably, according to this mode, the shoulder land portion region 63 and the shoulder land portion region 73 are point symmetrical with respect to the point positioned at the center of the groove width of the center circumferential main groove 40 as a reference.

Note that, in FIG. 2, the illustration of the lug grooves with sipes 44, 54, the second sipes 48, the fourth sipes 58, the shoulder sipes 64, 74, and the circumferential sipes 66, 76 is omitted.

COMPARATIVE EXAMPLES AND EXAMPLES

In order to study effects of the pneumatic tire according to the present embodiment, various changes were made to a tread pattern of a tire, and high-speed steering stability and wet steering stability were studied. Each of tires produced as test tires had a size of 235/65 R16C 115/113R and had a cross-sectional shape illustrated in FIG. 2. A tread pattern thereof was based on the tread pattern illustrated in FIG. 3 except for the matters in Table 1 and Table 2 and modes illustrated below.

In Table 1 and Table 2, a mode relating to a tread pattern of each tire and an evaluation result thereof are shown.

In Table 1 and Table 2, for "Mode of block", when the blocks formed in the inner land portion region corresponded to the substantially triangular blocks, "substantially triangular" is shown. When the blocks formed in the inner land portion region did not correspond to the substantially triangular blocks (Conventional Example, Comparative Examples), characteristics of elements of the blocks are shown.

Specifically, Conventional Example was similar to Example 1 except for using lug grooves passing through the land portion region in place of lug grooves with sipes.

Comparative Example 1 was similar to Example 1 except that the second sipes and the lug grooves with sipes were inclined to the same side in the tire circumferential direction.

Comparative Example 2 was similar to Example 1 except for using lug grooves with sipes in place of the second sipes and further joining opening ends of two lug grooves with sipes.

Comparative Example 3 was similar to Example 1 except for disposing lug grooves with sipes so that lug grooves were positioned inward of the first sipes in the tire width direction.

High-Speed Steering Stability

A van with a maximum loading capacity of 3.5 ton was used as a test vehicle. Each test tire was mounted to a wheel with a rim size of 16×61/2J. An air pressure of a front tire was set to 300 kPa, and an air pressure of a rear tire was set to 480 kPa. Sensory evaluation was performed on steering characteristics, straight travel characteristics, and the like while a test driver performed traveling on a test course formed of a dry road surface at a speed ranging from 0 km to 200 km per hour. The results are shown with indexes taking Conventional Example as a base of 100. Larger index values indicate more excellent high-speed steering stability. When the index value was 104 or more, it was evaluated that high-speed steering stability was excellent.

Wet Steering Stability

Each test tire was mounted to the same test vehicle used for the evaluation test for high-speed steering stability. Sensory evaluation was performed on steering characteristics, straight travel characteristics, and the like while a test driver performed traveling on a test course formed of a wet low μ road with a water depth of 1.5 mm or less at a speed ranging from 0 km to 80 km per hour. The results are shown with indexes taking Conventional Example as a base of 100. Larger index values indicate more excellent wet steering stability. When the index value was 100 or more, it was evaluated that the degradation of wet steering stability was prevented.

TABLE 1-1

|  | Conventional Example | Comparative Example 1 | Comparative Example 2 | Comparative Example 3 |
|---|---|---|---|---|
| Mode of block | Through lug groove | Parallelogram | Two lug grooves with sipes | Lug groove on inner side |
| Raised bottom portion of first sipe | No | No | No | No |
| Raised bottom portion of second sipe | No | No | No | No |
| Groove width of lug groove at opening end and closed end | a = b | a = b | a = b | a = b |

TABLE 1-1-continued

|  | Conventional Example | Comparative Example 1 | Comparative Example 2 | Comparative Example 3 |
|---|---|---|---|---|
| Groove depth of lug groove at opening end and closed end | s = t | s = t | s = t | s = t |
| Position of closed end of lug groove | 0.5a | 0.5a | 0.5a | 0.5a |
| Ratio of interval S3 with respect length S1 of first side (%) | 100 | 100 | 100 | 100 |
| High-speed steering stability | 100 | 90 | 102 | 103 |
| Wet steering stability | 100 | 100 | 102 | 100 |

TABLE 1-2

|  | Example 1 | Example 2 | Example 3 | Example 4 |
|---|---|---|---|---|
| Mode of block | Substantially triangular | Substantially triangular | Substantially triangular | Substantially triangular |
| Raised bottom portion of first sipe | No | Yes | Yes | Yes |
| Raised bottom portion of second sipe | No | No | Yes | Yes |
| Groove width of lug groove at opening end and closed end | a = b | a = b | a = b | a > b |
| Groove depth of lug groove at opening end and closed end | s = t | s = t | s = t | s = t |
| Position of closed end of lug groove | 0.5a | 0.5a | 0.5a | 0.5a |
| Ratio of interval S3 with respect length S1 of first side (%) | 100 | 100 | 100 | 100 |
| High-speed steering stability | 105 | 107 | 110 | 112 |
| Wet steering stability | 100 | 100 | 100 | 100 |

TABLE 2

|  | Example 5 | Example 6 | Example 7 | Example 8 | Example 9 |
|---|---|---|---|---|---|
| Mode of block | Substantially triangular | Substantially triangular | Substantially triangular | Substantially triangular | Substantially triangular |
| Raised bottom portion of first sipe | Yes | Yes | Yes | Yes | Yes |
| Raised bottom portion of second sipe | Yes | Yes | Yes | Yes | Yes |
| Groove width of lug groove at opening end and closed end | a > b | a > b | a > b | a > b | a > b |

TABLE 2-continued

|  | Example 5 | Example 6 | Example 7 | Example 8 | Example 9 |
|---|---|---|---|---|---|
| Groove depth of lug groove at opening end and closed end | s > t | s > t | s > t | s > t | s > t |
| Position of closed end of lug groove | 0.5a | 0.3a | 0.6a | 0.5a | 0.5a |
| Ratio of interval S3 with respect length S1 of first side (%) | 100 | 100 | 100 | 0 | 135 |
| High-speed steering stability | 114 | 116 | 113 | 110 | 107 |
| Wet steering stability | 103 | 102 | 104 | 103 | 100 |

Examples 1 to 9 are compared with Conventional Example and Comparative Examples 1 to 3. From the comparison, it can be understood that high-speed steering stability is excellent and the degradation of wet steering stability can be prevented by disposing the substantially triangular blocks side by side in the tire circumferential direction in the inner land portion region.

Example 1 and Example 2 are compared, and Example 2 and Example 3 are compared. From the comparisons, it can be understood that high-speed steering stability is further improved when the first sipes and the second sipes include raised bottom portions.

Example 3 and Example 4 are compared, and Example 4 and Example 5 are compared. From the comparisons, it can be understood that high-speed steering stability is further improved when the groove width and the groove depth of the lug groove at the closed end are smaller than the groove width and the groove depth at the opening end.

Examples 5 and 8 and Example 9 are compared. From the comparison, it can be understood that high-speed steering stability is improved when S3 has a length from 0% to 130% of S1.

The foregoing has been a detailed description of the pneumatic tire according to embodiments of the present technology. However, the pneumatic tire according to an embodiment of the present technology is not limited to the above embodiments or examples and may of course be enhanced or modified in various ways within the scope of the present technology.

The invention claimed is:

1. A pneumatic tire comprising a tread portion provided with a tread pattern, the tread pattern comprising:
at least two circumferential main grooves extending in a tire circumferential direction;
a plurality of lug grooves with sipes being disposed at an interval in the tire circumferential direction in a land portion region between a first circumferential main groove and a second circumferential main groove of the circumferential main grooves and extending to pass through the land portion region; and
a plurality of second sipes being alternately disposed with the lug grooves with sipes in the tire circumferential direction at an interval in the tire circumferential direction in the land portion region, extending to pass through the land portion region and opening to the first circumferential main groove and the second circumferential main groove, wherein
the lug grooves with sipes each comprise:
a lug groove extending in the land portion region from the first circumferential main groove toward the second circumferential main groove and being closed in the land portion region; and
a first sipe further extending from the lug groove toward the second circumferential main groove and opening to the second circumferential main groove,
the lug grooves with sipes extend to be inclined with respect to a tire width direction,
the second sipes extend to be inclined with respect to the tire width direction in a side opposite to a side in the tire circumferential direction in which the lug grooves with sipes are inclined,
the lug grooves with sipes and the second sipes are connected at an opening end at which the lug groove opens to the first circumferential main groove such that a plurality of triangular blocks surrounded by the second circumferential main groove, the lug grooves with sipes, and the second sipes are disposed side by side in the land portion region in the tire circumferential direction,
the triangular blocks each comprise a first side where the opening end is contact with the first outer circumferential main groove and a second side defined between two opening ends at which the lug grooves with sipes and the second sipe open to the second circumferential main groove, a position in the tire circumferential direction of the first side including a position in the tire circumferential direction of a center of the second side, and
the triangular blocks are disposed at an interval in the tire circumferential direction, and the interval has a length from 1 to 130% of a length of the opening end of the lug groove in the tire circumferential direction.

2. The pneumatic tire according to claim 1, wherein the first sipe has a sipe depth at an end joined to the lug groove shallower than that of an intermediate region in an extending direction of the first sipe.

3. The pneumatic tire according to claim 2, wherein, the second sipes each have a sipe depth at opening ends opening to the circumferential main grooves shallower than that of an intermediate region between the opening ends.

4. The pneumatic tire according to claim 2, wherein the lug groove has a groove width at an end connected to the first sipe narrower than that of the opening end.

5. The pneumatic tire according to claim 2, wherein the lug groove has a groove depth at the end connected to the first sipe shallower than that of the opening end.

6. The pneumatic tire according to claim 1, wherein a closed end of the lug groove is positioned in a region from 20 to 70% of a length of the land portion region in the tire width direction from the first circumferential main groove in the tire width direction.

7. The pneumatic tire according to claim 1, wherein the second circumferential main groove is disposed closer to a tire centerline with respect to the first circumferential main groove.

8. The pneumatic tire according to claim 1,
the tread pattern further comprising, a third circumferential main groove positioned on a side opposite a side in which the first circumferential main groove is positioned in the tire width direction with respect to the second circumferential main groove,
a plurality of second lug grooves with sipes being disposed at an interval in the tire circumferential direction in a second land portion region and extending to pass through the second land portion region; the second lug grooves with sipes each comprising:
  a second lug groove extending in the second land portion region between the second circumferential main groove and the third circumferential main groove from the third circumferential main groove toward the second circumferential main groove and being closed in the second land portion region; and
  a third sipe further extending from the second lug groove to the second circumferential main groove; and
a plurality of fourth sipes being alternately disposed with the second lug grooves with sipes in the tire circumferential direction at an interval in the second land portion region in the tire circumferential direction and extending to pass through the second land portion region, wherein
the second lug grooves with sipes extend to be inclined with respect to the tire width direction,
the fourth sipes extend to be inclined with respect to the tire width direction in a side opposite to a side in the tire circumferential direction in which the second lug grooves with sipes are inclined,
the second lug grooves with sipes and the fourth sipes are connected at an opening end at which the second lug groove opens to the third circumferential main groove such that a plurality of second triangular blocks surrounded by the second circumferential main groove, the second lug grooves with sipes, and the fourth sipes are disposed side by side in the second land portion region in the tire circumferential direction, and
ends in the tire circumferential direction of the triangular blocks in the land portion region between the first circumferential main groove and the second circumferential main groove and ends of the second triangular blocks in the tire circumferential direction are disposed at different positions in the tire circumferential direction.

9. The pneumatic tire according to claim 3, wherein at an end joined to the first sipe, the lug groove has a groove width narrower than that of the opening end.

10. The pneumatic tire according to claim 9, wherein at the end joined to the first sipe, the lug groove has a groove depth shallower than that of the opening end.

11. The pneumatic tire according to claim 10, wherein a closed end of the lug groove is positioned in a region from 20 to 70% of a length of the land portion region in the tire width direction from the first circumferential main groove in the tire width direction.

12. The pneumatic tire according to claim 11, wherein the plurality of triangular blocks are disposed at an interval in the tire circumferential direction, and the interval has a length from 0 to 130% of a length of the opening end of the lug groove in the tire circumferential direction.

13. The pneumatic tire according to claim 12, wherein the second circumferential main groove is disposed closer to a tire centerline with respect to the first circumferential main groove.

14. The pneumatic tire according to claim 13,
the tread pattern further comprising, in addition to the at least two circumferential main grooves, a third circumferential main groove positioned on a side opposite a side in which the first circumferential main groove is positioned in the tire width direction with respect to the second circumferential main groove, and
when the land portion region, the lug groove, the plurality of lug grooves with sipes, and the plurality of triangular blocks are each referred to as: a first land portion region, a first lug groove, a plurality of first lug grooves with sipes, and a plurality of first triangular blocks, the tread pattern further comprising:
a plurality of second lug grooves with sipes being disposed at an interval in the tire circumferential direction in a second land portion region and extending to pass through the second land portion region, the plurality of second lug grooves with sipes each comprising:
a second lug groove extending in the second land portion region between the second circumferential main groove and the third circumferential main groove from the third circumferential main groove to the second circumferential main groove, the second lug groove being closed in the second land portion region; and
a third sipe further extending from the second lug groove to the second circumferential main groove; and
a plurality of fourth sipes being alternately disposed with the plurality of second lug grooves with sipes in the tire circumferential direction at an interval in the second land portion region in the tire circumferential direction, the plurality of fourth sipes extending to pass through the second land portion region, wherein
the plurality of second lug grooves with sipes extend to be inclined with respect to the tire width direction,
the plurality of fourth sipes extend to be inclined with respect to the tire lateral direction in a side opposite to a side in the tire circumferential direction in which the plurality of second lug grooves with sipes are inclined,
at an opening end at which the second lug groove opens to the third circumferential main groove, the plurality of second lug grooves with sipes and the plurality of fourth sipes are joined,
a plurality of second triangular blocks surrounded by the second circumferential main groove, the plurality of second lug grooves with sipes, and the plurality of fourth sipes are disposed side by side in the second land portion region in the tire circumferential direction, and
ends of the first triangular blocks in the tire circumferential direction and ends of the second triangular blocks in the tire circumferential direction are disposed at different positions in the tire circumferential direction.

15. The pneumatic tire according to claim 1, wherein
the triangular block is a trapezoidal block surrounded by the first side, the second side, the lug groove with a sipe, and the second sipe,
in the triangular block, a distance between the lug grooves with sipes and the second sipe in the tire circumferential direction is increased as approaching the second circumferential main groove from the first circumferential main groove, and a tire circumferential position of the first side is present in a range in which the second side is positioned in the tire circumferential direction.

\* \* \* \* \*